JAMES R. ALBERTS
KIM L. O'HARA
INVENTORS

BY Fred S. Valles

ATTORNEY 3,421,739
APPARATUS FOR GRAVITY BLENDING
OF SOLIDS
James R. Alberts, San Marino, Calif., and Kim L.
O'Hara, Baker, La., assignors to Rexall Drug and
Chemical Company, Los Angeles, Calif., a corporation of Delaware
Filed June 27, 1967, Ser. No. 649,213
U.S. Cl. 259—4                                    5 Claims
Int. Cl. B01f 5/26; B01f 15/00

ABSTRACT OF THE DISCLOSURE

A gravity flow solids blender for solid plastic pellets incorporating flow control devices in the form of a baffle member at the apex of an inverted cone section or a butterfly valve in association with "dead space" eliminating devices in the inverted cone section consisting of an internal baffle or external tubes containing at least one aperture for removal of solids.

---

This invention relates to an apparatus for the gravity blending of solids, and particularly, to an improved gravity flow blender providing superior blending characteristics at increased production rates and efficiencies.

Frequently, in industry, it becomes a requirement or necessity to blend solids, particularly where the material to be blended is derived from separate or individual batch operations. Difficulties have been encountered, however, in attempting to obtain from such solids a product constituted of a satisfactory homogenous composition. This problem arises quite frequently in the manufacture of thermoplastics, involving for example, polyethylene and polypropylene pellets which can be in the form of cubes, spheres, cylinders, discs or other shapes measuring approximately 1/16 to 1/4 inch on a side or diameter. Generally, in prior are devices it has been the practice to blend solids, such as thermoplastic pellets, by means of tumbling, such as with double cone blenders or by screw mixers adapted to agitate the entire mass of material while confining the solids within a vessel.

It has also been proposed in the prior art that a blending vessel be utilized having means therein for withdrawing solids from a number of random points and levels. These means, generally constitute tubes, each having a plurality of openings at different vertical locations therein. Although this type of blending apparatus is superior to the screw type mixer apparatus, nevertheless it is subject to inaccuracies in the blending consistency of the solids. Thus, the screw type mixer has proved to be too expensive in operation and difficult to maintain, whereas the blender having tubes, each of which has a multiplicity of holes, has been proved to provide a solids product lacking the necessary degree of uniformity.

Many of the problems and disadvantages encountered in the prior art blending apparatuses have been overcome by the novel process and apparatus for the gravity blending of solids, as for example, thermoplastic pellets described in U.S. Patent application No. 402,071, filed Oct. 7, 1964, now U.S. Patent 3,351,326. In the aforementioned patent the blending operation comprises placing a substantial mass of a solids material, as for example, polyethylene or polypropylene pellets, in a vertically upright blending vessel and withdrawing material from the vessel from a number of random points and elevations to obtain a uniform and homogeneous mixture. This withdrawal of the material is obtained through the use of a multiplicity of tubes spaced throughout the confines of the blending vessel and extending vertically therethrough for substantially the entire height of the vessel. Each of these tubes has one vertically elongated slot cut therein adapted to receive solids from the blending vessel. None of the slots or openings in any of the tubes are placed at identical heights. The slots are designed and spaced to cover the full range of material placed within the vessel and consequently, facilitate the withdrawal of material simultaneously from all levels and over the entire horizontal cross section of the solids material in the vessel. All of the solids withdrawn from the tubes and the blending vessel are deposited into a blending chamber which is in communication with a conveyor system or conduit adapted to either recycle the material to the blending vessel for further blending and mixing or convey the material to another source for further treatment. The blending vessel used to carry out this blending operation comprises a generally cylindrical upper shell section adapted to receive the solids material which is to be blended, and a lower shell section of generally inverted conical configuration joined to the upper cylindrical section. An outlet port is provided in the apex or lowest point of the conical section to permit the egress of blended solids materials which have not been passed into the tubes located in the blending vessel.

Although the above described blending vessel has proved generally satisfactory in operation, and far superior to other types of prior are blending apparatuses, problems have been encountered in attempting to obtain uniformly blended solids materials within reasonable short and economic operating times and cycles. In particular, difficulties in obtaining satisfactorily uniform material blending have been caused by stagnation areas or "dead spaces" in the cone section of the blender vessel wherein the solids material tends to accumulate and lag behind the normal discharge and flow patterns. Extensive testing and analysis has shown that the "dead spaces" exist primarily in the region of the tangent line where the inverted conical section joins the cylindrical shell of the blender vessel, and in the vicinity or region of the cone section apex, where the tubes pass through the vessel shell into the blend chamber. The stagnation areas or "dead spaces" in the conical section of the blending vessel greatly reduced the blender efficiency inasmuch as the unblended materials collected in the stagnation areas remained until the material level in the blender vessel dropped below the level of the stagnant material. This, of course, had a deleterious effect on the quality of the blended material, necessitating further recycling and reblending with a resultant loss in production output rates.

The gravity blending apparatus according to this invention overcomes the foregoing and other problems encountered in the prior art by providing an improved blending vessel having a unique lower conical shell section containing baffle means adapted to control the flow of blended solids material therethrough and eliminate stagnation areas in the cone section. Another aspect of the improved blender apparatus according to this invention is the provision of external tubes on the blender cone section having apertures in communication with the interior of the cone section which will facilitate removal of solids material accumulated in the stagnation areas of the cone section.

Accordingly, it is an object of this invention to provide an improved apparatus for solids blending, functioning entirely by gravity flow except for the power required to recycle the product in order to produce a solids product having improved and more uniform blending properties.

It is a further object of this invention to provide an apparatus for solids blending which will facilitate a more uniform withdrawal of solids from all levels of the blending apparatus.

Another object of this invention is to provide an apparatus for solids blending having a blending vessel material outlet cone section which will facilitate and enhance the blending of the solids material.

Yet another object of this invention is to provide an apparatus for solids blending wherein the blending vessel has an improved material outlet cone section including baffle means for controlling the flow of solids material therethrough.

Still another object of this invention is to provide an apparatus for solids blending wherein the outlet cone section of the blender vessel includes conduit or tube means positioned externally thereof and adapted to remove solids material from the exterior of the cone section to thereby eliminate stagnation areas deleterious to the quality of the material blend.

The manner in which these and other objects of this invention will be obtained will become apparent from the following detailed description and drawings, in which.

Figure 1:
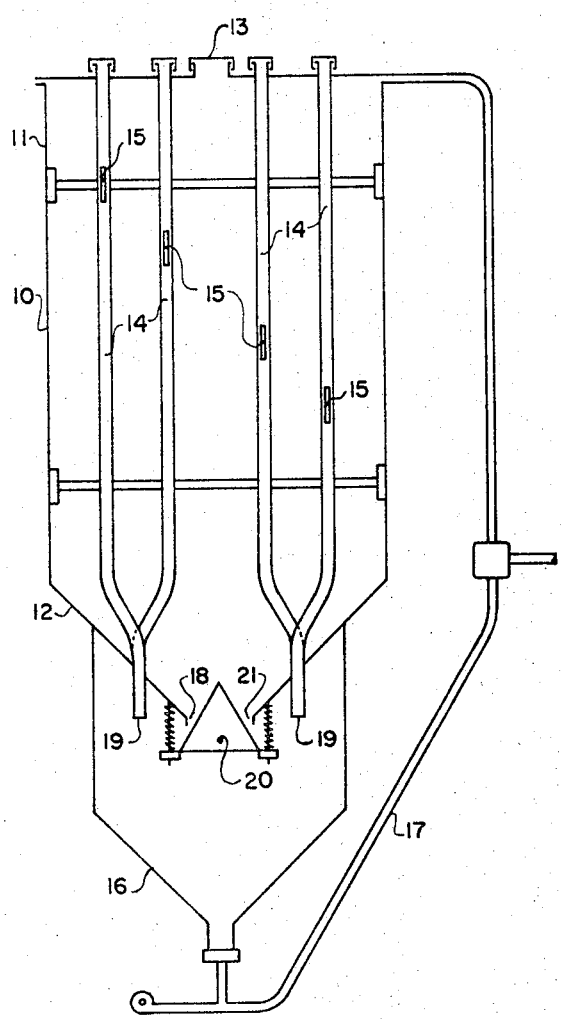
FIG. 1 is a front elevational view, partially in schematic, of one embodiment of a blender according to this invention, with all valve details omitted.

Referring now in particular to FIGURE 1 of the drawings, there is illustrated a gravity blender or vessel 10 comprised of a substantially cylindrical housing 11 and an inverted conical section 12 attached to the lower end of housing 11. An inlet port 13 is provided in the upper portion of blender 10, through which a substantial amount of a solids material, as for example, polyethylene, polypropylene, polystyrene, polyvinyl chloride pellets or other flowable solids may be conveyed into the blender 10. Material is withdrawn from the blender 10 from a plurality of specifically selected points and elevations to obtain a uniform and homogeneous blend or solids mixture. This withdrawal of the material is obtained through the use of a multiplicity of tubes 14 placed lengthwise within said vessel 10 and spaced throughout the confines thereof in substantially equiangular fashion around said confined mass and which extend vertically therethrough for substantially the entire height of the vessel. Each of these tubes 14 has one vertically elongated slot 15 or other shaped hole therein adapted to receive solids from the blending vessel. None of the slots 15 or openings in one embodiment of this invention in any of the tubes 14 is placed at identical heights. The slots 15 are designed and spaced one below the other in each separate tube 14 to cover the full range of material placed within the vessel and consequently, facilitate the withdrawal of substantially equal portions of material simultaneously from all levels of the solids material in the vessel. All of the solids withdrawn from the tubes and the blending vessel are deposited into a blending or collection chamber 16 which is in communication with a conveyor system or conduit 17 adapted to either recycle the material to the blending vessel 10 for further blending and mixing or to convey the material to another source (not shown) for further treatment.

The inverted conical section 12 illustrated in the embodiment of FIG. 1 includes in its apex an outlet port 18 whereby solids material collected in the blender vessel 10, which does not enter tubes 14 through slots 15, may be passed into blending or collection chamber 16. In the blending chamber 16 the materials passing out of the lower openings 19 or outlets of tubes 14 and outlet port 18 will be mixed into a homogeneous mass and permitted to flow into conduit 17 for recycling or further treatment as desired.

Figure 3:
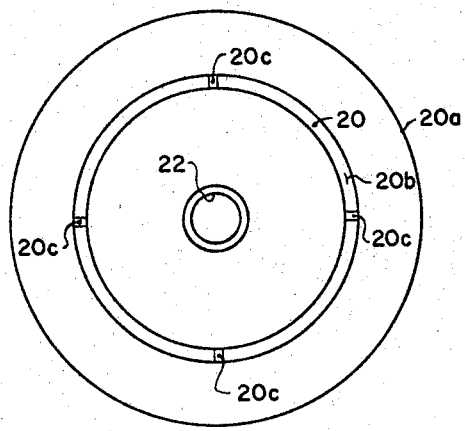
FIG. 3 is a top plan view of the baffle member shown in FIG. 2.

In order to control or meter the flow of material through conical section 12, a movable baffle member 20 is provided within port 18. This device is not only the principle means of controlling the flow from the bottom outlet but it also aids in directing the flow at the walls in the cone section. The baffle member may comprise a generally upright conical member adapted to have its apex protrude into conical section 12 and positioned within outlet port 18 so as to form an annular opening 21 for egress of solids material to the blending chamber 16. An annular flange 20a (FIGURE 2) may surround the base of the conical member 20 in spaced relation thereto so as to provide an annular passageway 20b for the flow of solids material along the side wall of the conical member into the blending or collection chamber 16. Annular flange 20a may be fastened to the conical member 20 by means of spaced struts 20c as shown in FIG. 3 of the drawings. Suitable mechanical means (not shown) may be provided whereby manual or automatic control over the vertical position of the baffle member 20 within outlet port 18 is maintained. This, in effect, will then permit the size of annular opening 21 to be varied as required according to amounts and dimensions of solids material passing therethrough. By controlling the flow of solids material through conical section 12 in conjunction with material flow through tubes 14 many of the problems of attempting to obtain a homogeneous or uniform solids blend are mitigated or entirely eliminated.

Figure 2:
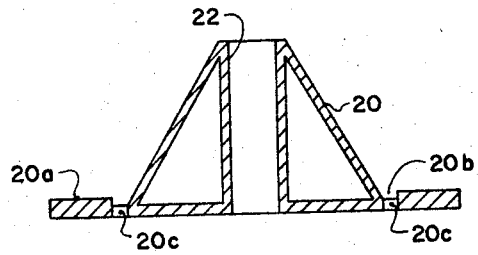
FIG. 2 is an enlarged sectional elevational view of the baffle member of FIG. 1.

If desired, in order to maintain some flow of solids material through conical section 12 at all times, conical baffle member 20, as shown in FIG. 2, may be provided with a vertical passageway 22 which places the interior of conical section 12 in communication with blending or collection chamber 16.

Figure 4:
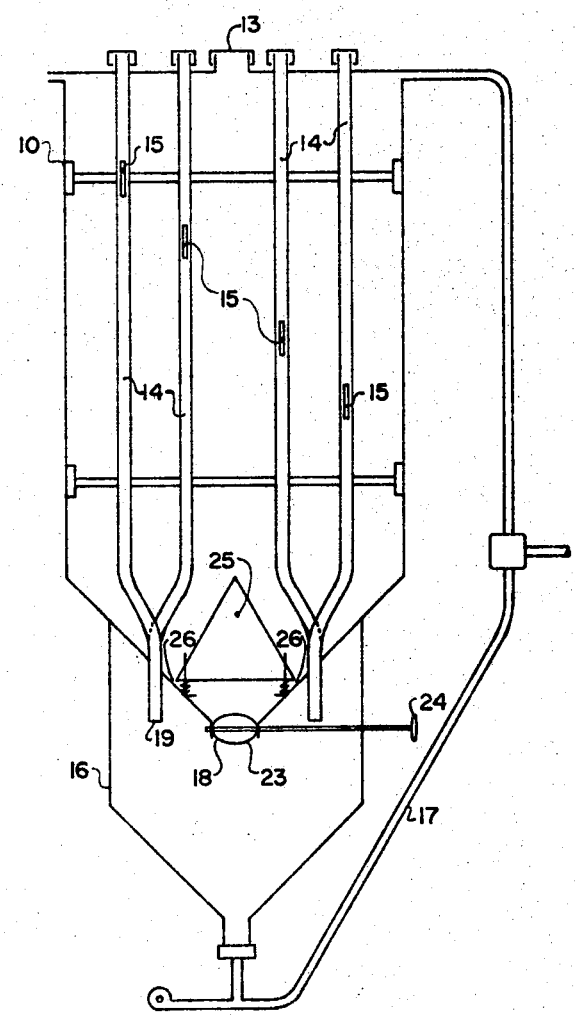
FIG. 4 is a partial front elevational view, partially in schematic, of another embodiment of a blender according to this invention.

A second embodiment of the present invention is illustrated in FIG. 4 of the drawings. Conical section 12 of blender vessel 10 has valve means 23 provided in its outlet port 18 in order to control or meter the flow of solids material through the interior of the conical section. Valve means 23 may be constructed of a butterfly valve adapted to be controlled by means of a rod 24 extending externally of blending chamber 16. Manual or automatic controls may be provided for actuation of the butterfly valve 23, depending on the amounts and sizes of solids material to be passed through outlet port 18 into the blending chamber 16.

A baffle member 25 is positioned within conical section 12 in order to vary and meter the flow of solids material therethrough. Baffle member 25 preferably is in the form of an upright cone member, located generally in the median region of the inverted conical section 12 and spaced concentrically with the inner wall of the latter in order to provide an annular orifice 26 for the flow of solids material from cylindrical section 11 through conical section 12 towards the outlet port 18. Member 25 is preferably located at or near the origin of the "dead space" which is at the elevation where the tubes pass through the vessel shell into the blend chamber. Location of the cone at this point forces flow at the points where bridging or stagnation is most likely to occur.

The conical baffle member 25 can be vertically movable relative to the conical section 12, whereby the size of annular orifice 26 may be varied as desired in order to obtain an optimum blended solids material flow through the blender 10, dependent upon the particle size and geometry of the solids material. Suitable mechanical means (not shown), obvious to one skilled in the art, may be provided in order to impart the desired movement to the conical baffle member 25.

Figure 5:
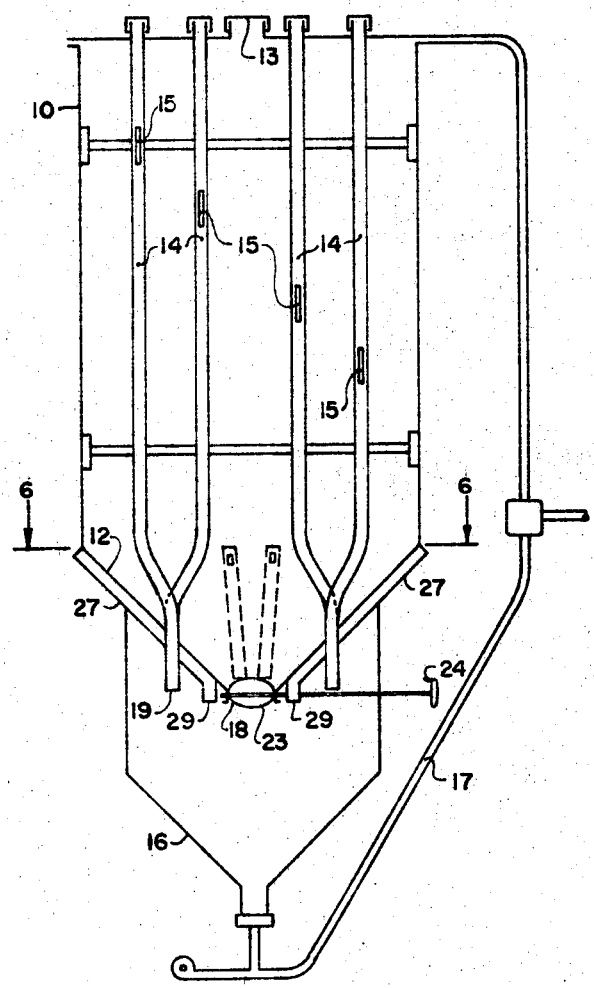
FIG. 5 is a partial front elevational view, partially in schematic, of a third embodiment of a blender according to this invention.
Figure 6:
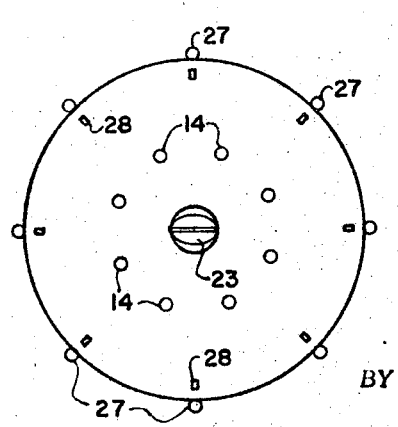
FIG. 6 is a plan view section on line 6—6 of FIG. 5.

In order to eliminate agglomeration of solids material in stagnation areas or so called "dead spaces" in the conical section 12, hollow tubes 27 as shown in FIGS. 5 and 6, can be fastened externally thereto. The tubes 27 can extend generally from the line of tangency between cylindrical section 11 and conical section 12 down toward outlet port 18. Suitable apertures 28 (at least one in each tube) can be provided in tubes 27 and the wall of conical section 12 in the region of the "dead spaces," thereby permitting material collected in these spaces to flow into tubes 27 and out through their lower openings 29 into blending or collection chamber 16. Although apertures 28 may be positioned at any elevation within conical section 12, experimentation has shown that most stagnation areas in the conical section 12 occur in the vicinity of the line of tangency with cylindrical shell section 11.

At least one, but preferably a plurality of tubes 27 can be spaced as needed about the periphery of the conical section 12 in order to eliminate the stagnation areas in which the solids materials will accumulate. The spacing of the tubes 27 can be in equi-angular relationship about the periphery of the conical shell as shown.

Although the external tubes 27 are shown herein in association with butterfly valve 23, it becomes obvious to one skilled in the art that in lieu of the butterfly valve 23, the conical baffle member 20 can be used to control the flow of solids material through conical section 12.

The external tubes 27 may also be used in conjunction with baffle member 25 positioned within conical section 12 as shown in FIG. 4 of the drawings.

From the foregoing it is apparent that two principal flow control devices are provided by this invention, namely member 20 of FIGURE 1 and member 23 of FIGURE 4 whereas member 25 of FIGURE 4 and external tubes 27 of FIGURE 6 are the basic "dead space" eliminating devices.

In test carried out to determine the blending efficiency of the novel gravity blender of this invention, substantially 20,000 to 135,000 pound lot sizes of plastic pellets of various shapes were used in blend ratios ranging from 3:1 to 100:1. Highly satisfactory blend efficiencies of 95–99% were obtained in less than one half the recirculation time for gravity blenders not utilizing the present improved conical section structure.

An advantage of the gravity blender of this invention over tumbler and other types is that different shapes can be blended together, while the tumbler types tend to segregate rather than blend different sizes and shapes. With the novel provisions of this invention for the elimination of dead spaces when odd shapes or sizes of materials would normally accumulate, the advantages of the blender herein are further enhanced.

What is claimed is:

1. A gravity-flow solids blender comprising an elevated vessel having a generally cylindrical upper shell portion and a lower shell portion of a generally inverted conical configuration, material inlet means in the upper end of said cylindrical portion and a material outlet port in the apex of said inverted conical portion, baffle means comprising an upright conical member having a generally vertical passageway extending therethrough from its apex to its base portion so as to provide a further outlet port means for material collected in the conical portion of said vessel, the base segment of said baffle means being disposed below the inverted conical portion of said vessel, the apex of said upright conical member projecting through the cone outlet port into said conical portion whereby said cone outlet port defines a generally annular opening and wherein said baffle means is vertically adjustable with respect to the outlet port of said inverted conical vessel portion whereby the size of said annular opening may be varied so as to facilitate metering of material passing therethrough, a plurality of spaced hollow vertical tube members positioned interiorly of said vessel and extending through said lower conical portion, said tube members each having at least one material receiving opening in communication with the interior of said vessel and material outlet ports at their bottom extremities, and including means for the common collection of material passing through said cone and tube member outlet ports.

2. A gravity-flow solids blender comprising an elevated vessel having a generally cylindrical upper shell portion and a lower shell portion of a generally inverted conical configuration, material inlet means in the upper end of said cylindrical portion and a material outlet port in the apex of said inverted conical portion, said inverted conical portion including at least one hollow tube member fastened to the exterior surface of said vessel inverted conical portion, said tube member extending from substantially the region of juncture between the base of said inverted conical portion and the cylindrical shell portion of the vessel to the lower apex region of said inverted conical portion, said tube member having at least one material receiving aperture in communication with the interior of said inverted conical portion and a material outlet port at its lower extremity for conveying material to a common collecting means, baffle means at least partially disposed within said inverted conical portion and adapted to control flow of said material therethrough, a plurality of spaced hollow vertical tube members positioned interiorly of said vessel and extending through said low conical portion, said tube members each having at least one material receiving opening in communication with the interior of said vessel and material outlet ports at their bottom extremities, and including means for the common collection of material passing through said cone and the tube outlet member ports.

3. A blender as defined in claim 2 including a plurality of said hollow tube members attached to the exterior surface of said vessel conical shell portion, and spaced in equi-angular relationship about the periphery thereof so as to provide a plurality of spaced material receiving apertures in communication with the material of said inverted conical portion.

4. A gravity-flow solids blender comprising an elevated vessel having a generally cylindrical upper shell portion and a lower shell portion of a generally inverted conical configuration, material inlet means in the upper end of said cylindrical portion and a material outlet port in the apex of said inverted conical portion, baffle means in said material outlet port in combination with valve adapted to control flow of material therethrough, said baffle means being at least partially disposed within said inverted conical portion and also adapted to control flow of material therethrough, a plurality of spaced hollow vertical tube members positioned interiorly of said vessel and extending through said lower conical portion, said tube members each having at least one material receiving opening in communication with the interior of said vessel and material outlet ports at their bottom extremities, and including means for the common collection of material passing through said cone and tube member outlet ports.

5. A blender as defined in claim 4 wherein said valve means comprises a butterfly valve.

References Cited

UNITED STATES PATENTS 3,138,369   6/1964   Bennett _____ 259—95
3,351,326   11/1967   Alberts et al. _____ 259—95

ROBERT W. JENKINS, *Primary Examiner.*

U.S. Cl. X.R.

259—180